(12) United States Patent
Kraas et al.

(10) Patent No.: US 6,246,823 B1
(45) Date of Patent: Jun. 12, 2001

(54) ENDOSCOPIC OPTICAL SYSTEM

(75) Inventors: Mathias Kraas, Haseldorf; Helmut Hirsemann, Neumuenster, both of (DE)

(73) Assignee: Olympus Winter & Ibe GmbH, Hamburg (DE)

( * ) Notice: Subject to any disclaimer, the term of this patent is extended or adjusted under 35 U.S.C. 154(b) by 0 days.

(21) Appl. No.: 09/371,693

(22) Filed: Aug. 10, 1999

(30) Foreign Application Priority Data

Aug. 11, 1998 (DE) ................................ 198 36 285

(51) Int. Cl.⁷ .................... G02B 6/06; G02B 27/00
(52) U.S. Cl. ................ 385/117; 359/820; 359/894; 359/740; 257/81
(58) Field of Search ............... 385/117; 359/820, 359/894, 740, 830; 257/81, 82

(56) References Cited

U.S. PATENT DOCUMENTS

| 4,723,833 | * | 2/1988 | Yamada | 359/820 |
|---|---|---|---|---|
| 5,377,669 | * | 1/1995 | Schulz | 385/117 |
| 5,504,350 | * | 4/1996 | Ortyn | 257/81 |
| 5,691,853 | * | 11/1997 | Miyano | 359/740 |
| 5,917,651 | * | 6/1999 | Yahata | 359/894 |

* cited by examiner

Primary Examiner—Loha Ben
(74) Attorney, Agent, or Firm—Rankin, Hill, Porter & Clark LLP

(57) ABSTRACT

An endoscopic optical system includes an elongate metal housing with a circular opening in its end in which a transparent window is received. The window has a cylindrical outer edge surface which is metallized over at least part of its area and is opposed to the cylindrical internal surface of the opening. An annular solder joint is provided in the gap between the opposed cylindrical surfaces. The solder joint has a thickness in the direction perpendicular to the window which is only a proportion of the thickness of the window.

9 Claims, 1 Drawing Sheet

ENDOSCOPIC OPTICAL SYSTEM

FIELD OF THE INVENTION

This invention relates to an optical system of the type including a metal housing with an opening in which a substantially planar transparent window is received, the window having an outer edge surface which is metallized over at least part of its area and is opposed to the internal surface of the opening, an annular solder joint being provided in the gap between the opposed surfaces.

BACKGROUND OF THE INVENTION

Endoscopic optical systems have a metal housing which is generally constructed in the form of a tube in its distal region and with a broadened portion in its proximal end region. A window is provided at at least the distal end of the housing through which the optical device of the optical system can look outwardly with an objective. In endoscopes with an optical eyepiece, a window which enables one to look in is also provided at the proximal end. The windows are usually constructed as plane parallel plates of e.g. glass which are connected to the housing in a sealed manner at their edges.

The connection of the window to the housing is effected in optical systems of the type referred to above by soldering in a marginal gap between the cylindrical outer edge surface of the window and a cylindrical internal surface on the housing, as is illustrated in relation to the example of the distal window in DE 37 40 417 A1. As explained therein, the edge of the window is metallized in constructions of the type referred to above in order to render soldering possible, which can only be effected between metal surfaces.

The known construction referred to above requires very careful soldering of the entire window edge. It has, however, transpired that this is disadvantageous since soldering over the entire area of the edge or side surface of the window produces stresses in the glass which can lead to breakage. This occurs particularly as a result of current requirements on endoscopic optical systems as regards sterilizability which can only be fulfilled by frequent autoclaving, that is to say hot steam sterilization. The rapid changes in temperature associated therewith promote stress cracks in the glass.

An endoscopic optical system with a soldered window, which is not of the type referred to above, is disclosed in DE 196 44 729 A1. The cylindrical window is secured in a metal tube by introducing adhesive into the gap between the window and the housing. Corner soldering is provided on the internal surface of the window on an appropriately metallized annular portion of the internal surface of the window. This construction is, however, difficult to manufacture as a result of the soldering process within the tube and results in a reduction in the usable area of the window.

SUMMARY OF THE INVENTION

It is an object of the present invention to provide an optical system of the type referred to above in which soldering of the window does not result in breakage of the window, even when it is subjected to frequent, substantial changes in temperature.

In accordance with the present invention, in an endoscopic optical system of the type referred to above, the soldered joint has a dimension in the direction perpendicular to the window which is less than the thickness of the window. Thus, in the optical system in accordance with the invention, the outer edge surface of the window is soldered to the opposing surface of the metal housing only over a narrow annular region which extends over only a proportion of the thickness, i.e., less than the thickness of the window in the direction of the thickness of the window. In practice, the thickness of the annular soldered joint may be between one-quarter and three-quarters, preferably about one half, of the thickness of the window. It transpires that the stresses to which the window is subjected as a result of the soldering process are considerably reduced and thus that stress cracking of the window can be substantially eliminated. Optical systems in accordance with the invention can be autoclaved with rapid changes in temperature over a prolonged period of time without stress cracks occurring in the window.

In one embodiment of the invention, only that proportion of the edge surface of the window which is contacted by the solder is metallized. This permits solder to be applied to the entire edge surface of the window in a very simple manner. However, the solder adheres only to the metallized region of the window while the remaining portions of the gap automatically remain free of solder.

In one embodiment of the invention, the or each region of the gap which is not occupied by solder is occupied by a lost masking ring. The masking ring is "lost" in the sense that it is positioned around the window to shield part of the periphery thereof and then remains there as part of the endoscopic instrument. The masking ring or rings may be simply pushed onto the side surface of the window. Those portions of the gap which are occupied by a masking ring are automatically maintained free of solder during the subsequent soldering operation. Soldering thus occurs only in those regions of the gap in which no masking ring is located. This permits the window to be metallized over its entire peripheral edge surface which substantially simplifies the metalization process.

It is preferred that the soldered joint is positioned substantially centrally with respect to the height of the window in the direction of the length of the housing. This results in a particularly favorable distribution of stresses in the window and thus in a substantially reduced risk of breakage.

In one embodiment of the invention the window projects beyond the end of the metal housing, that is to say, it projects out of the opening in the housing, and the soldered joint is situated within the outer portion of the gap between the window and the housing. This is a simple way of maintaining the outer portion of the side surface of the window free of solder without the necessity of using any particular device, such as a masking ring, for this purpose. In one embodiment there is a masking ring disposed in the inner portion of the gap between the window and the housing. This inherently results in only the central portion of the side surface of the window being soldered to the housing. The solder joint is localized in the direction towards the exterior of the housing by the fact that the opposing surface of the housing is set back with respect to the side surface of the window and is localized towards the interior of the housing by the masking ring. The soldering can be effected very simply from the exterior of the housing and the window may be metallized over its entire side surface. This construction is very resistant to applied stresses and may be manufactured very economically.

In an alternative construction the window is partially cut away, on one side or on both sides, so as to reduce the height of the side surface. It is so cut away that proportion of the outer edge of the window which remains parallel and adjacent to the internal surface of the opening has a height which is only a proportion of the thickness of the window in the direction of the length of the housing.

In a further alternative, the opening in the housing is defined by an inwardly directed flange whose thickness is only a proportion of the thickness of the window in the direction of the length of the housing.

The invention also embraces an endoscope including an optical system of the type referred to above.

BRIEF DESCRIPTION OF THE DRAWINGS

Further features of the invention will be apparent from the following description of certain specific embodiments of the invention which is given by way of example with reference to the accompanying drawings.

DESCRIPTION OF PREFERRED EMBODIMENTS

Figure 1:
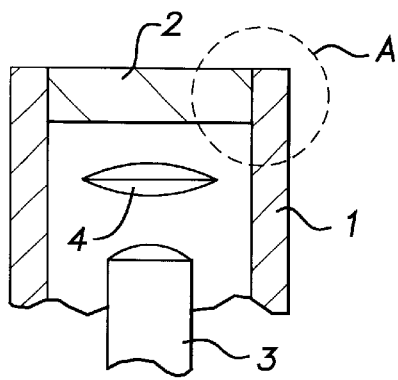
FIG. 1 is a highly schematic axial sectional view through the end of an endoscope optical system housing with a window.

FIG. 1 is a highly schematic view of the end region of an optical system comprising an elongate tubular metal housing 1 with a flat or substantially planar window 2 at its end consisting of glass or, e.g., sapphire. An optical assembly is indicated with a rod lens 3. Lens 4 is an objective or an eyepiece.

Figure 2:
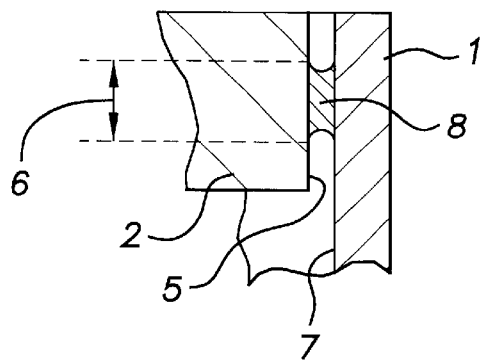
FIG. 2 is an enlarged schematic view of region A of FIG. 1.

FIG. 2 is a view on an enlarged scale of the region designated A in FIG. 1 of the first embodiment. The window 2 is constructed in this case with a cylindrical edge 5, which is metallized only on a central annular region 6 (between the chain lines). The cylindrical inner surface 7 of the housing 1 consists of metal suitable for soldering. If solder material is introduced, whilst being appropriately heated, into the gap between the window 2 and the housing 1, a solder joint 8 forms only in the region of the annular region 6 between the edge 5 of the window 2 and the inner surface 7 of the housing 1, as shown in FIG. 2, as a result of the surface tension of the solder material. The regions at the gap on each side of the solder joint 8 remain free of solder. The annular region 6, over which the window is soldered, is so narrow that stresses introduced into the glass by the soldered joint 8 are sufficiently small that there is no substantial risk of stress cracking of the window 2 under the thermal loading.

The soldered joint 8 could also be situated in a narrow annular region which is situated close to the outer surface of the window 2 (towards the top of FIG. 2) or close to the inner surface of the window 2 towards the interior of the housing. This would also result in a reduction in the thermal stresses by comparison with soldering the entire surface of the edge of the window. The central region shown in FIG. 2 results, however, in particularly favorable stress conditions.

Figure 3:
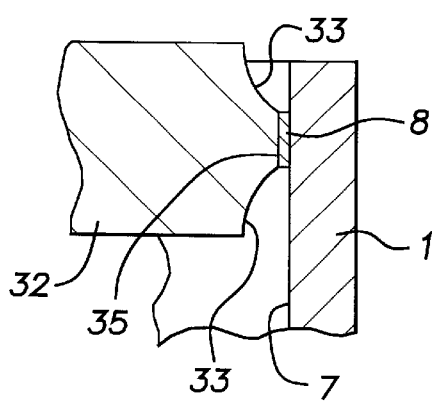
FIGS. 3 to 6 are views similar to FIG. 2 of modified embodiments of the invention.

FIG. 3 shows another embodiment in which the window 32 is cut away at its periphery by virtue of the provision of upper and lower annular concavities 33 so that a remaining cylindrical end region 35 is produced which is situated approximately at the center of the height of the window (in the axial direction) and is substantially shorter than the thickness of the window 32. The solder 8 is applied to this remaining axial edge region 35 in the gap between it and the opposed internal cylindrical surface 7 of the housing 1.

Figure 4:
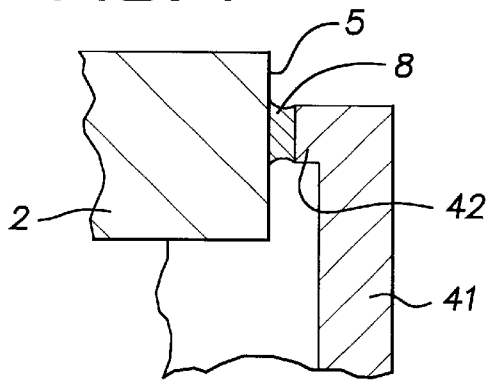

FIG. 4 shows an embodiment in which the window 2 is similar to that in FIG. 2 and has a cylindrical peripheral edge 5 extending over the entire thickness of the window. In order to simplify manufacture, the entire cylindrical edge 5 can be metallized in this embodiment. The limitation of the height of the solder joint 8 is effected in this embodiment by the provision of an internal flange 42 on the housing 41. The axial length of the internal flange 42 and its disposition with respect to the window 2 determine the position of the solder region and its height, that is to say the axial length of the solder joint 8, which is advantageously again situated in the center of the window 2.

Figure 5:
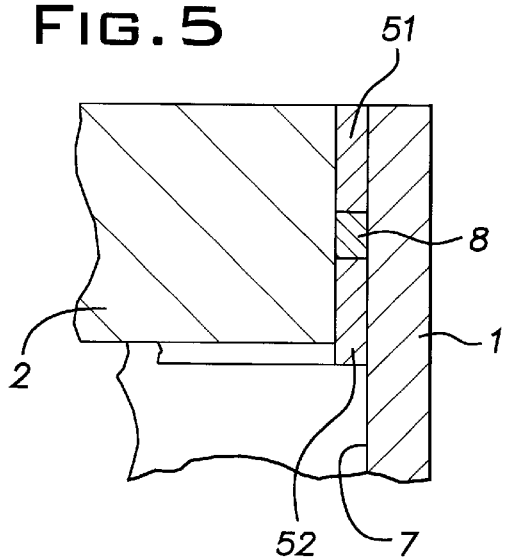

FIG. 5 shows an embodiment in which the housing 1 and the window 2 are similar to those in the construction of FIG. 2. The edge of the window can be metallized in this case over its entire height. The limitation of the solder 8 to the central region of the window is effected in this case by masking rings 51 and 52, which are inserted into the top and bottom of the gap between the edge of the window 2 and the cylindrical internal surface 7 of the housing 1 leaving a gap between them and which localize the solder joint 8 externally and internally. The application of solder to the annular passage between the rings 51 and 52 can be effected, for instance, through holes, which are not shown, in the housing 1 or by providing solder powder between the rings.

Figure 6:
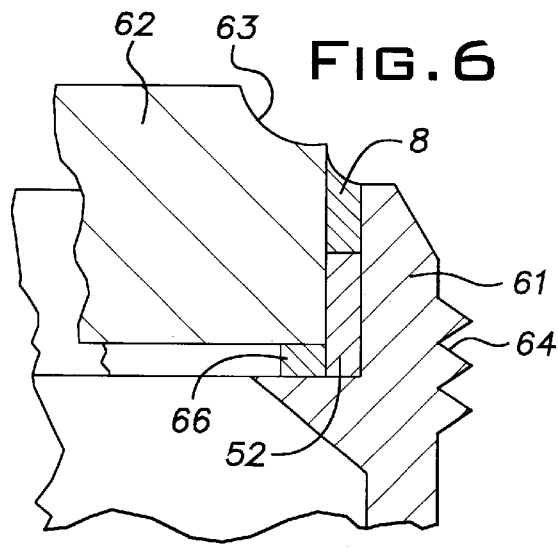

FIG. 6 shows a further constructional possibility by way of the example of an eyepiece window 62 in the end of a housing 61. The window 62 has an annular concavity 63 in its upper outer edge which reduces the height of its peripheral outer edge. The housing 61 has an external screw thread 64 for screwing on the bell of an eyepiece.

The end of the housing 61 is axially set back with respect to the outer surface of the window 62. An inner masking ring 52, similar to that in FIG. 5, is provided at the bottom of the gap between the edge of the window and the opposing surface of the housing. As may be seen in FIG. 6, the solder 8 is localized inwardly by the masking ring 52 and outwardly by the upper edge of the housing 61. It is again located in the center of the thickness of the window 62, that is to say in a manner which is very favorable as regards stresses.

An internal shoulder 65 is provided as an installation aid on the housing 61, which is abutted by the window with the interposition of an annular spacer ring 66. The size and position of the solder joint 8 can be precisely adjusted by co-ordinating the position of the shoulder 65 and the axial height of the spacer ring 66 and of the masking ring 52. As may be seen, the soldering can be effected from the exterior.

Obviously, numerous modifications and variations of the present invention are possible in the light of the above teachings. It is therefore to be understood that within the scope of the appended claims, the invention may be practiced otherwise than as specifically described herein.

What is claimed is:

1. An endoscopic optical system including
   a metal housing;
   means in said housing defining an opening surrounded by an internal surface;
   a substantially planar transparent window received in said opening, said window having a thickness and an outer edge surface, said outer edge surface being metallized over at least part of its area and being opposed to said internal surface of said opening, said internal surface and said outer edge surface defining a gap; and
   an annular solder joint in said gap, said solder joint having a dimension in a direction perpendicular to said window which is less than the thickness of said window.

2. An endoscopic optical system as claimed in claim 1 wherein only that proportion of said outer edge surface of said window which is contacted by said solder joint is metallized.

3. An endoscopic optical system as claimed in claim 1 including a lost masking ring within the or each portion of said gap which is not occupied by said solder joint.

4. An endoscopic optical system as claimed in claim 1 wherein said solder joint is positioned substantially centrally with respect to the thickness of said window.

5. An endoscopic optical system as claimed in claim 4 including a lost masking ring situated within an inner portion of said gap between said inner surface of said opening and said outer edge surface of said window.

6. An endoscopic optical system as claimed in claim 1 wherein said window projects outwardly beyond said metal housing and said solder joint is situated within an outer portion of said gap between said internal surface of said opening and said outer edge of said window.

7. An endoscopic optical system as claimed in claim 6 including a lost masking ring situated within an inner portion of said gap between said inner surface of said opening and said outer edge surface of said window.

8. An endoscopic optical system as claimed in claim 1 wherein said window is partially cut away, whereby only a proportion of said outer edge surface of said window is parallel and adjacent to said inner surface of said opening, said proportion of said outer edge surface having a thickness which is only a proportion of the thickness of said window.

9. An endoscopic optical system as claimed in claim 1 wherein said housing includes an inwardly directed flange, said flange having a thickness and defining said opening in said housing, the thickness of said flange being only a proportion of the thickness of said window.

* * * * *